United States Patent
Clark et al.

(10) Patent No.: US 9,217,644 B2
(45) Date of Patent: Dec. 22, 2015

(54) NATURAL NAVIGATIONAL GUIDANCE

(71) Applicant: TeleCommunication Systems, Inc., Annapolis, MD (US)

(72) Inventors: Brant Miller Clark, Mt. Baldy, CA (US); Mark Goddard, Rancho Santa Margarita, CA (US); Diego Andres Kaplan, San Diego, CA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 0 days.

(21) Appl. No.: 13/751,660

(22) Filed: Jan. 28, 2013

(65) Prior Publication Data
US 2013/0197798 A1 Aug. 1, 2013

Related U.S. Application Data

(60) Provisional application No. 61/591,151, filed on Jan. 26, 2012, provisional application No. 61/591,148, filed on Jan. 26, 2012, provisional application No. 61/711,546, filed on Oct. 9, 2012.

(51) Int. Cl.
  *G01C 21/36* (2006.01)
  *G01C 21/26* (2006.01)
(52) U.S. Cl.
  CPC ............ *G01C 21/26* (2013.01); *G01C 21/3644* (2013.01); *G01C 21/3658* (2013.01)
(58) Field of Classification Search
  CPC ........... G01C 21/3644; G01C 21/3658; G01C 21/26; G01C 21/3629; G01C 21/36
  USPC ........................................................ 701/428
  See application file for complete search history.

(56) References Cited

U.S. PATENT DOCUMENTS

| 4,737,916 A | 4/1988 | Ogawa |
| 4,939,662 A | 7/1990 | Numura |

(Continued)

FOREIGN PATENT DOCUMENTS

| EP | 0837434 | 4/1998 |
| GB | 2305568 | 4/1997 |

(Continued)

OTHER PUBLICATIONS

International Search Report received in PCT/US2013/23470 dated Dec. 16, 2013.

(Continued)

*Primary Examiner* — Mary Cheung
*Assistant Examiner* — Anne Mazzara
(74) *Attorney, Agent, or Firm* — William H. Bollman

(57) ABSTRACT

Natural navigational guidance, provides enhanced guidance instructions that take advantage of unique geographic features along a navigated route to specify maneuver points. Guidance points are clearly visible, unambiguous, and locally unique features in the geography of the maneuver area that can be used to aid the user in discovering the place where the maneuver point is. Within a guidance point selection area, a specific guidance point type has a more strict area within which it can be used. A natural guidance point selection area for an upcoming maneuver to be navigated is determined, and a unique geographic feature within the determined natural guidance point selection area is selected as a natural guidance point for navigation of the upcoming maneuver. A turn-type natural guidance point for an upcoming maneuver to be navigated is generated when the user device is within the natural guidance point selection area.

10 Claims, 17 Drawing Sheets

(56) References Cited

U.S. PATENT DOCUMENTS

| | | |
|---|---|---|
| 5,223,844 A | 6/1993 | Mansell |
| 5,317,321 A | 5/1994 | Sass |
| 5,389,934 A | 2/1995 | Kass |
| 5,557,254 A | 9/1996 | Johnson |
| 5,636,122 A | 6/1997 | Shah |
| 5,684,951 A | 11/1997 | Goldman |
| 5,689,269 A | 11/1997 | Norris |
| 5,689,809 A | 11/1997 | Grube |
| 5,712,899 A | 1/1998 | Pace, II |
| 5,727,057 A | 3/1998 | Emery |
| 5,758,313 A | 5/1998 | Shah |
| 5,774,824 A | 6/1998 | Streit |
| 5,790,974 A | 8/1998 | Tognazzini |
| 5,801,700 A | 9/1998 | Ferguson |
| 5,802,492 A | 9/1998 | DeLorme |
| 5,944,768 A | 8/1999 | Ito |
| 5,982,301 A | 11/1999 | Ohta |
| 5,987,381 A | 11/1999 | Oshizawa |
| 6,035,253 A | 3/2000 | Hayashi |
| 6,049,718 A | 4/2000 | Stewart |
| 6,084,951 A | 7/2000 | Smith |
| 6,091,957 A | 7/2000 | Larkins |
| 6,127,945 A | 10/2000 | Mura-Smith |
| 6,138,003 A | 10/2000 | Kingdon |
| 6,148,261 A | 11/2000 | Obradovich |
| 6,163,749 A | 12/2000 | McDonough |
| 6,182,227 B1 | 1/2001 | Blair |
| 6,185,426 B1 | 2/2001 | Alperovich |
| 6,188,957 B1 | 2/2001 | Bechtolsheim |
| 6,204,844 B1 | 3/2001 | Fumarolo |
| 6,226,367 B1 | 5/2001 | Smith |
| 6,249,742 B1 | 6/2001 | Friederich |
| 6,278,936 B1 | 8/2001 | Jones |
| 6,317,684 B1 | 11/2001 | Roeseler |
| 6,321,158 B1 | 11/2001 | DeLorme |
| 6,331,825 B1 | 12/2001 | Ladner |
| 6,353,664 B1 | 3/2002 | Cannon |
| 6,356,836 B1 | 3/2002 | Adolph |
| 6,362,778 B2 | 3/2002 | Neher |
| 6,366,782 B1 | 4/2002 | Fumarolo |
| 6,366,856 B1 | 4/2002 | Johnson |
| 6,377,210 B1 | 4/2002 | Moore |
| 6,397,143 B1 | 5/2002 | Peschke |
| 6,405,033 B1 | 6/2002 | Kennedy, III |
| 6,415,224 B1 | 7/2002 | Wako |
| 6,434,482 B1 | 8/2002 | Oshida |
| 6,441,752 B1 | 8/2002 | Fomukong |
| 6,442,384 B1 | 8/2002 | Shah |
| 6,442,391 B1 | 8/2002 | Johansson |
| 6,459,782 B1 | 10/2002 | Bedrosian |
| 6,466,788 B1 | 10/2002 | Carlsson |
| 6,487,495 B1 | 11/2002 | Gale |
| 6,525,768 B2 | 2/2003 | Obradovich |
| 6,526,350 B2 | 2/2003 | Sekiyama |
| 6,529,143 B2 | 3/2003 | Mikkola |
| 6,535,743 B1 | 3/2003 | Kennedy, III |
| 6,539,080 B1 | 3/2003 | Bruce |
| 6,563,824 B1 | 5/2003 | Bhatia |
| 6,571,169 B2 | 5/2003 | Miyaki |
| 6,571,174 B2 | 5/2003 | Rigazio |
| 6,587,782 B1 | 7/2003 | Nocek |
| 6,621,423 B1 | 9/2003 | Cooper |
| 6,643,516 B1 | 11/2003 | Stewart |
| 6,661,353 B1 | 12/2003 | Gopen |
| 6,662,016 B1 | 12/2003 | Buckham |
| 6,665,613 B2 | 12/2003 | Duvall |
| 6,665,715 B1 | 12/2003 | Houri |
| 6,674,849 B1 | 1/2004 | Froeberg |
| 6,675,089 B2 | 1/2004 | Hirabayashi |
| 6,678,613 B2 | 1/2004 | Andrews |
| 6,700,505 B2 | 3/2004 | Yamashita |
| 6,721,652 B1 | 4/2004 | Sanqunetti |
| 6,721,716 B1 | 4/2004 | Gross |
| 6,766,174 B1 | 7/2004 | Kenyon |
| 6,771,969 B1 | 8/2004 | Chinoy |
| 6,775,371 B2 | 8/2004 | Elsey |
| 6,801,850 B1 | 10/2004 | Wolfson |
| 6,810,405 B1 | 10/2004 | LaRue |
| 6,816,782 B1 | 11/2004 | Walters |
| 6,819,919 B1 | 11/2004 | Tanaka |
| 6,829,532 B2 | 12/2004 | Obradovich |
| 6,839,630 B2 | 1/2005 | Sakamoto |
| 6,842,696 B2 | 1/2005 | Silvester |
| 6,845,321 B1 | 1/2005 | Kerns |
| 6,853,849 B1 | 2/2005 | Tognazzini |
| 6,859,723 B2 | 2/2005 | Yokota |
| 6,885,874 B2 | 4/2005 | Grube |
| 6,898,516 B2 | 5/2005 | Pechatnikov |
| 6,910,818 B2 | 6/2005 | McLoone |
| 6,925,603 B1 | 8/2005 | Naito |
| 6,941,127 B2 | 9/2005 | Muramatsu |
| 6,944,535 B2 | 9/2005 | Iwata |
| 6,999,875 B2 | 2/2006 | Tu |
| 7,038,590 B2 | 5/2006 | Hoffman |
| 7,043,362 B2 | 5/2006 | Krull |
| 7,058,506 B2 | 6/2006 | Kawase |
| 7,079,863 B2 | 7/2006 | Chikaishi |
| 7,089,110 B2 | 8/2006 | Pechatnikov |
| 7,139,722 B2 | 11/2006 | Perrella |
| 7,142,196 B1 | 11/2006 | Connor |
| 7,142,205 B2 | 11/2006 | Chithambaram |
| 7,149,533 B2 | 12/2006 | Laird |
| 7,167,187 B2 | 1/2007 | Scott |
| 7,171,304 B2 | 1/2007 | Wako |
| 7,202,801 B2 | 4/2007 | Chou |
| 7,266,376 B2 | 9/2007 | Nakagawa |
| 7,286,929 B2 | 10/2007 | Staton |
| 7,565,157 B1 | 7/2009 | Ortega |
| 7,653,544 B2 | 1/2010 | Bradley |
| 7,739,033 B2 | 6/2010 | Murata |
| 7,751,614 B2 | 7/2010 | Funakura |
| 7,786,876 B2 | 8/2010 | Troxler |
| 7,881,730 B2 | 2/2011 | Sheha |
| 7,912,637 B2 | 3/2011 | Horvitz |
| 7,925,438 B2 | 4/2011 | Lo |
| 8,112,529 B2 | 2/2012 | Van Den Oord |
| 8,264,570 B2 | 9/2012 | Karimoto |
| 8,285,245 B2 | 10/2012 | Ashley |
| 8,301,159 B2 | 10/2012 | Hamynen |
| 8,331,611 B2 | 12/2012 | Johnson |
| 8,332,402 B2 | 12/2012 | Forstall |
| 2001/0015756 A1 | 8/2001 | Wilcock |
| 2001/0016849 A1 | 8/2001 | Squibbs |
| 2002/0032036 A1 | 3/2002 | Nakajima |
| 2002/0059201 A1 | 5/2002 | Work |
| 2002/0069239 A1 | 6/2002 | Katada |
| 2002/0077123 A1 | 6/2002 | Otsuka |
| 2002/0086683 A1 | 7/2002 | Kohar |
| 2002/0120622 A1 | 8/2002 | Hasegawa |
| 2002/0130906 A1 | 9/2002 | Miyaki |
| 2002/0169539 A1 | 11/2002 | Menard |
| 2003/0013483 A1 | 1/2003 | Ausems |
| 2003/0014487 A1 | 1/2003 | Iwakawa |
| 2003/0032448 A1 | 2/2003 | Bulthuis |
| 2003/0036848 A1 | 2/2003 | Sheha et al. |
| 2003/0036949 A1 | 2/2003 | Kaddeche |
| 2003/0045327 A1 | 3/2003 | Kobayashi |
| 2003/0060938 A1 | 3/2003 | Duvall |
| 2003/0078054 A1 | 4/2003 | Okuda |
| 2003/0125064 A1 | 7/2003 | Koskinen |
| 2003/0126250 A1 | 7/2003 | Jhanji |
| 2003/0149526 A1 | 8/2003 | Zhou |
| 2003/0151501 A1 | 8/2003 | Teckchandani |
| 2003/0158657 A1 | 8/2003 | Agnew |
| 2003/0165254 A1 | 9/2003 | Chen |
| 2003/0231190 A1 | 12/2003 | Jawerth |
| 2003/0236618 A1 | 12/2003 | Kamikawa |
| 2004/0002814 A1 | 1/2004 | Gogic |
| 2004/0008225 A1 | 1/2004 | Campbell |
| 2004/0021567 A1 | 2/2004 | Dunn |
| 2004/0054428 A1 | 3/2004 | Sheha et al. |
| 2004/0058656 A1 | 3/2004 | Chikaishi |
| 2004/0124977 A1 | 7/2004 | Biffar |
| 2004/0186880 A1 | 9/2004 | Yamamoto |

(56) References Cited

U.S. PATENT DOCUMENTS

| | | |
|---|---|---|
| 2004/0204829 A1 | 10/2004 | Endo |
| 2004/0205517 A1 | 10/2004 | Lampert |
| 2004/0220957 A1 | 11/2004 | McDonough |
| 2004/0229595 A1 | 11/2004 | Laursen |
| 2005/0027445 A1 | 2/2005 | McDonough |
| 2005/0062636 A1 | 3/2005 | Conway |
| 2005/0085999 A1 | 4/2005 | Onishi |
| 2005/0125148 A1 | 6/2005 | Van Buer |
| 2005/0153729 A1 | 7/2005 | Logan |
| 2005/0159883 A1 | 7/2005 | Humphries |
| 2005/0219067 A1 | 10/2005 | Chung |
| 2005/0242168 A1 | 11/2005 | Tesavis |
| 2006/0019724 A1 | 1/2006 | Bahl |
| 2006/0041375 A1 | 2/2006 | Witmer |
| 2006/0074547 A1 | 4/2006 | Kaufman |
| 2006/0148488 A1 | 7/2006 | Syrbe |
| 2006/0200359 A1 | 9/2006 | Khan |
| 2006/0268120 A1 | 11/2006 | Funakura |
| 2006/0270421 A1 | 11/2006 | Phillips |
| 2007/0004461 A1 | 1/2007 | Bathina |
| 2007/0032244 A1 | 2/2007 | Counts |
| 2007/0083911 A1 | 4/2007 | Madden |
| 2007/0139411 A1 | 6/2007 | Jawerth |
| 2007/0208687 A1 | 9/2007 | O'Connor et al. |
| 2007/0268392 A1 | 11/2007 | Paalasmaa |
| 2008/0014931 A1 | 1/2008 | Yared |
| 2008/0077324 A1 | 3/2008 | Hatano |
| 2008/0129475 A1 | 6/2008 | Breed |
| 2008/0195314 A1 | 8/2008 | Green |
| 2008/0220747 A1 | 9/2008 | Ashkenazi |
| 2008/0288166 A1 | 11/2008 | Onishi |
| 2009/0113346 A1 | 4/2009 | Wickramasuriya |
| 2009/0177557 A1 | 7/2009 | Klein |
| 2009/0328163 A1 | 12/2009 | Preece |
| 2010/0004993 A1 | 1/2010 | Troy |
| 2010/0042592 A1 | 2/2010 | Stolz |
| 2010/0268848 A1 | 10/2010 | Maurya |
| 2011/0301838 A1 | 12/2011 | Isert |
| 2011/0307947 A1 | 12/2011 | Kariv |
| 2012/0166074 A1 | 6/2012 | Weng |

FOREIGN PATENT DOCUMENTS

| | | |
|---|---|---|
| WO | WO96/36930 | 11/1996 |
| WO | WO2004/074778 | 9/2004 |
| WO | WO2006/039660 | 4/2006 |
| WO | WO2011/072743 | 12/2009 |

OTHER PUBLICATIONS

Supplementary European Search Report in European Appl. No. 02 75 0138 dated Oct. 13, 2010.

Supplementary European Search Report in European Appl. No. 06839236.4 dated Dec. 6, 2010.

European Search Report mailed Apr. 9, 2009, for EP Application No. 05802548.7 filed Oct. 3, 2005, 14 pages.

Zhao, Y. (1997). *Vehicle Location and Navigation Systems*, Artech house, Injc.: Norwood, MA, Chapter 6, pp. 129-136, 158-166, and 229-236; Chapter 10, pp. 239-263. (57 pages total).

Extended European Search report in appl. No. 13741535.2 dated Jul. 15, 2015.

Lane Guidance: 3D Local Rd Stack-Turn Concept v1 041812

Lane Guidance: 2D Concept v1 041612

Lane Guidance: ECM Concept v1 041812

NATURAL NAVIGATIONAL GUIDANCE

The present invention claims priority from U.S. Provisional No. 61/591,148 to Clark et al., entitled "Natural Guidance", filed Jan. 26, 2012; from U.S. Provisional No. 61/591,151 to Clark et al., entitled "Lane Guidance", filed Jan. 26, 2012; and from U.S. Provisional No. 61/711,546 to Clark et al., entitled "Natural and Lane Guidance", filed Oct. 9, 2012, all of which are expressly incorporated herein by reference.

BACKGROUND OF THE INVENTION

1. Field of the Invention

This invention relates generally to navigation systems, and more particularly to wireless navigation systems such as on a Smartphone.

2. Background of Related Art

Natural guidance is known, e.g., as disclosed in NAVTEQ's natural guidance documentation "62d Product Variations Natural Guidance.pdf", the entirety of which is incorporated herein by reference. However, the NAVTEQ approach is not ideal.

SUMMARY

In accordance with the principles of the present invention, a method of providing natural navigational guidance to a user device comprises determining a natural guidance point selection area for an upcoming maneuver to be navigated. A geographic feature within the determined natural guidance point selection area is selected as a natural guidance point to be identified for navigation of the upcoming maneuver. A turn-type natural guidance point for an upcoming maneuver to be navigated is generated when the user device is within the natural guidance point selection area.

BRIEF DESCRIPTION OF THE DRAWINGS

Features and advantages of the present invention become apparent to those skilled in the art from the following description with reference to the drawings, in which.

DETAILED DESCRIPTION OF ILLUSTRATIVE EMBODIMENTS

Figure 1:
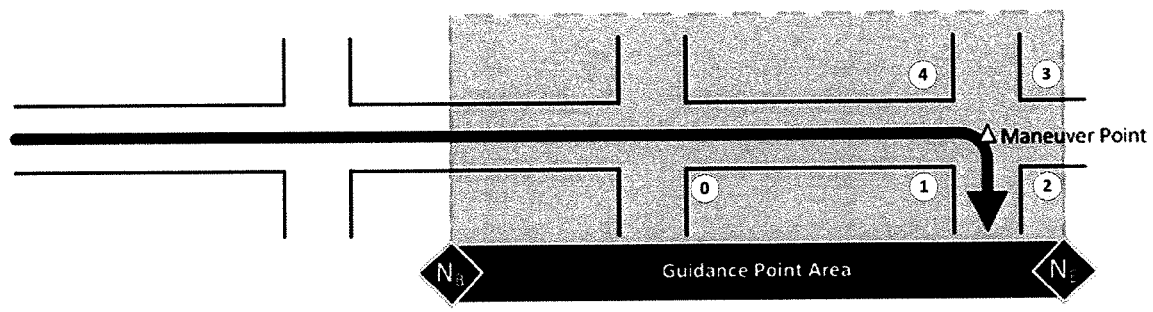
FIG. 1 shows Guidance Points selected according to a priority table, which is server configurable and can be updated without requiring a new client build. Different types of Guidance Points have varying priorities according to how close they are to the maneuver point and their position with respect to it. Priorities are determined depending on the position of the guidance point with respect to the maneuver point.

The Natural and Lane Guidance feature includes enhancements to the way directions are being provided to the user. Natural Guidance improves instructions by using features along the route as reference points instead of just mentioning street names and distances. Lane Guidance improves the user experience when driving on freeways and other wide roads by providing lane information visually and verbally. Guidance is improved to provide better, more concise instructions.

Glossary

| Term | Definition |
|---|---|
| Guidance Point | A feature along the route that is used in guidance as a reference point for a maneuver |
| Guidance Point Area | The area within a maneuver where the routing engine is allowed to pick up Guidance Points for that maneuver |
| MJO | Motorway Junction Object |

Extensive usability testing showed that providing navigation instructions in a more natural and human-like manner was highly desired by end users. Additionally, user feedback and observed behavior showed that when navigating, most people kept their wireless device (e.g., smartphone) in a place where the screen is not in clear view, so it is important to provide clear and concise voice instructions.

The Natural Guidance feature provides enhanced guidance instructions that take advantage of features along a navigated route to specify maneuver points using easy to understand reference points. The feature makes use of additional rules extracted from the map data (including additional data from NAVTEQ's Stop signs and Traffic lights products).

Ideally the natural guidance feature does not add new types of guidance prompts. Instead, it provides enhancements to existing prompts (Continue/Prepare/Turn) by sometimes replacing terse instructions based on distance with more clear instructions based on features around the maneuver that are clearly visible and easy to find by the driver. Guidance Points are features in the geography of the maneuver area that can be used to aid the user in discovering the place where the maneuver point is. Since Guidance Points are supposed to aid the user in locating a particular position, they are ideally clearly visible and unambiguous to ensure they will not cause confusion.

The following are examples of the various types of elements that could be used as Guidance Points:
- Natural elements such as lakes, mountains, hills or other kinds of formations that can be clearly spotted from the road (not used in present embodiments),
- Buildings that are easily identifiable, such as towers, churches, gas stations, restaurants, etc. (not used in present embodiments),
- Traffic lights, when clearly identifiable,
- Stop signs, when clearly identifiable,
- End of the road,
- Railroad tracks,
- Bridges, and
- Crossing streets While many guidance points are present in the map data, they are only relevant to a specific maneuver if they meet very strict criteria. Those criteria are clearly described herein.

Guidance Point Area

To be referenced in a "Prepare" or a "Turn" instruction, a Guidance Point of a certain type must be unique within a region called "Guidance Point Area".

FIG. 1 shows Guidance Points selected according to a priority table, which is server configurable and can be updated without requiring a new client build. Different types of Guidance Points have varying priorities according to how close they are to the maneuver point and their position with respect to it (if applicable).

In particular, as shown in FIG. 1, the Guidance Point Area starts at point NB and ends at point NE. NB is calculated using the same as the "Prepare" distance used by the client. The distance is calculated using the speed category of the segment, as the routing engine does not know the speed of the vehicle. The following table shows values at common speeds for the cases where the maneuver is in a surface street, a highway, or the destination:

| Speed mph | Distance for $N_B$ in meters (Normal-Freeway-Destination) | | |
| --- | --- | --- | --- |
| 25 | 411.23 | 1035.11 | 668.17 |
| 35 | 527.44 | 1321.16 | 775.43 |
| 45 | 643.64 | 1607.20 | 882.70 |
| 55 | 759.85 | 1893.24 | 989.97 |
| 65 | 876.05 | 2179.29 | 1097.23 |

NE is placed just past the maneuver point, such that it covers the opposite side of the street (corner) of the maneuver point. Note that this allows Guidance Points to be placed past the maneuver point, but only if they are immediately adjacent to it.

Guidance Point Selection Area

Within the Guidance Point Area, a specific guidance point type has a more strict area within which it can be used. For example, Traffic Lights and Stop Signs are only useful if they are on the maneuver point. Other guidance points may be allowed a bit farther from the point. This type-specific area is called the Guidance Point Selection Area and is defined as follows:

| # | Guidance Point type | Turn point area | Prepare to area |
| --- | --- | --- | --- |
| 1 | Natural guidance points from NAVTEQ | Must be adjacent to the turn point, no crossing streets in between | Yes |
| 2 | Railroad tracks | Must be adjacent to the turn point, no crossing streets in between | Yes |
| 3 | Traffic Lights | Must be on the turn point | Not used. Can be combined with #1, 2 or 6 |
| 4 | Stop sign | Must be on the turn point | Not used. Can be combined with #1, 2 or 6 |
| 5 | End of the road | Must be on the turn point | Not used. Can be combined with #1, 2 or 6 |
| 6 | Bridge | Must be adjacent to the turn point, no crossing streets in between | Yes |
| 7 | Street count | Up to 2 crossing streets ("Take the third street"), each street at most 75 meters (~250 ft) from the next one | Not used |

Guidance Point Selection Rules

Selection of guidance point is governed by several rules aimed at finding the best possible reference point to aid the user in understanding the maneuver. The following are the general rules:

There can only be one or two guidance points for each maneuver. It is expected that most maneuvers will have zero or one guidance points. A second guidance point is supported for some guidance point types to allow the case where directions can be improved by allowing the prepare instruction and the turn instruction to reference different guidance points;

Turn Guidance points can only be referenced if they are positioned within the Guidance Point Selection Area for the maneuver;

Prepare Guidance Points can be referenced outside the Guidance Point Selection Area only if they are not used as Turn Guidance points;

A guidance instruction cannot reference a guidance point that is behind the user's current position;

Prepare announcements can reference a guidance point anywhere in the Guidance Point Area;

Turn Announcements can only reference guidance points at or immediately before the turn. Note that "at the turn" includes guidance points that are past the maneuver point, but adjacent to it; and The type of a "candidate" guidance point must be unique within the Guidance Point Area for it to be referenced in the maneuver instruction. This means that if there is more than one guidance point of that type in the Guidance Point Area, none of them can be used.

Guidance Point Priority

The order of priority of selection of priority points in the exemplary disclosed embodiments is as follows:
(1) Traffic light;
(2) Stop sign;
(3) End of the road;
(4) Railroad tracks at position 1 in FIG. 1;
(5) Railroad tracks at position 0 in FIG. 1;
(6) Bridge; and
(7) Street count—should only be used if the streets are less than 75 meters of each other.

Usage Rules

Continue instructions: Guidance Points are not referenced in Continue instructions.

Prepare instructions: Guidance Points are referenced in the Prepare instruction if available for the maneuver (marked use-for-prepare in the protocol).

Turn instructions: Guidance Points are referenced in the Turn instruction if available for the maneuver (marked use-for-turn in the protocol).

Stacked maneuvers: Guidance Point may be more beneficial than using the street name, as stacked maneuvers can be handled in different ways, e.g.:
Using Street Name
Product says get ready for the stacked maneuver.
Natural Guidance Points
End of the Road FIG. 2 shows natural guidance using an "end of the road" guidance point, in accordance with the principles of the present invention.

Figure 2:
FIG. 2 shows natural guidance using an "end of the road" guidance point, in accordance with the principles of the present invention.

In particular, as shown in FIG. 2, natural guidance at the end of a road can be used when the user device dead ends into a perpendicular road, e.g., with the guidance "Turn right at the end of the road".

Bridge

Figure 3:
FIG. 3 shows natural guidance using a bridge, in accordance with the principles of the present invention.

FIG. 3 shows natural guidance using a bridge, in accordance with the principles of the present invention.

In particular, as shown in FIG. 3, bridges can be used as Guidance points when the user device is being driven on a bridge and the turn street is the first street at the end of the bridge and the end of the bridge is in the Guidance Point Area. At this point, as depicted in FIG. 3, the natural guidance may be, e.g., "Turn right after the bridge onto Crown Point Drive."

Street Counts

Figure 4:
FIG. 4 shows natural guidance using street counts, in accordance with the principles of the present invention.

FIG. 4 shows natural guidance using street counts, in accordance with the principles of the present invention.

In particular, as shown in FIG. 4, street counts can be used as a Guidance point when adjacent streets are very close together, making it unclear to the user device on which street to turn and the streets are within the Turn Instruction Distance and they are legal to turn on. In such case, as depicted in FIG. 4, the natural guidance may be, e.g., "Take the $2^{nd}$ right and enter the highway."

Train Tracks

Figure 5:
FIG. 5 shows natural guidance using railroad tracks, in accordance with the principles of the present invention.

FIG. 5 shows natural guidance using railroad tracks, in accordance with the principles of the present invention.

In particular, as shown in FIG. 5, railroad tracks can be used as Guidance points when the railroad tracks physically cross the street on which the user device is travelling and the crossing is within the Guidance Point Area and the turn street is the first one after the tracks.

Exemplary natural guidance in this scenario is, for a user device travelling East (A) in FIG. 5: "Turn left after the railroad tracks onto Knode Avenue", or for a user device travelling West (B): "Take an immediate left turn after the train tracks".

Stop Signs

Figure 6:
FIG. 6 shows natural guidance using stop signs, in accordance with the principles of the present invention.

FIG. 6 shows natural guidance using stop signs, in accordance with the principles of the present invention.

In particular, as shown in FIG. 6, stop sign data can be used as a Guidance Point when the stop sign is in the direction of travel and the street the user device must turn on is at the stop sign and there are no other stop signs on the user device's route within the Guidance Point Area that are applicable to the direction of travel. Exemplary natural guidance is: "Turn right at the stop sign onto Dylan Avenue."

Traffic Lights

Figure 7:
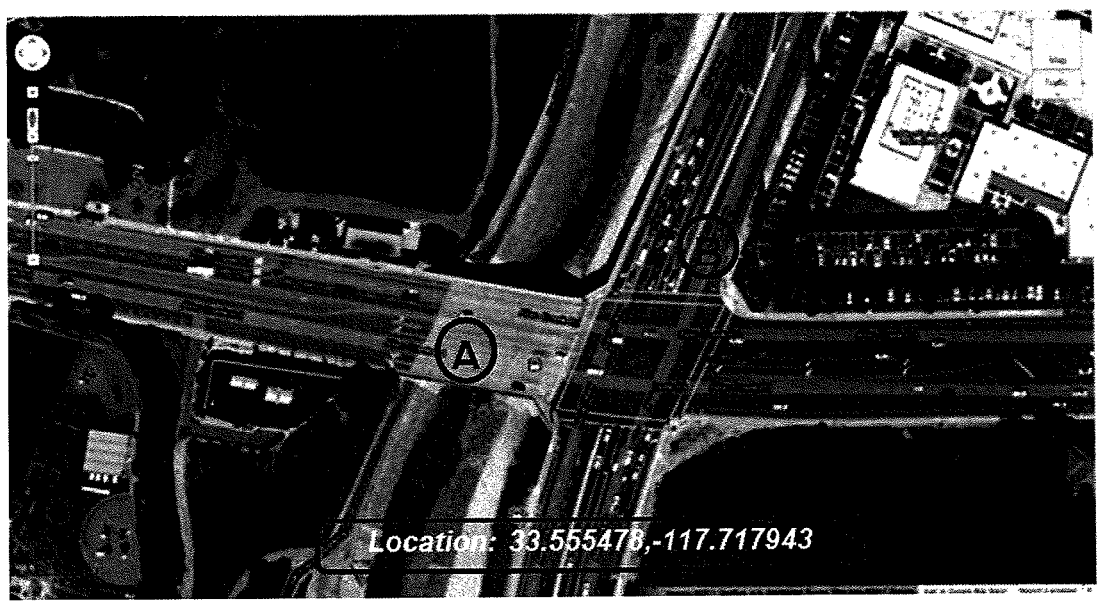
FIG. 7 shows natural guidance using traffic lights, in accordance with the principles of the present invention.

FIG. 7 shows natural guidance using traffic lights, in accordance with the principles of the present invention.

In particular, as shown in FIG. 7, traffic lights data can be used as a Guidance Point when the street the user device must turn on is at the traffic light and there are no other traffic lights on the user's route within the Guidance Point Area. In such scenario, the natural guidance may be "Turn left at the traffic light onto Alicia Parkway."

Audible Guidance Prompts
Timing Configuration

The timing for audible guidance is configurable. The configuration is dynamically done through the server. The timing of announcements can potentially change based on the presence of the following types of information: Lane Guidance, Natural Guidance, and Normal Guidance.

Prompt Length

The client performs calculations to determine the length of the message that is played, and adjusts the timing of the play based on when the play will end as opposed to where it will start. This means that longer messages start playing earlier.

Guidance Points and Lane Guidance

To keep voice prompts clear and concise, the system does not provide natural guidance and lane guidance in the same voice prompt. On highways, lane guidance has precedence over natural guidance, and on surface roads, natural guidance has precedence over lane guidance. In both cases, lane guidance visual information is shown if available. If the client cannot determine if the current road is a highway or a surface road, it is up to the routing engine to implement the priorities described by not including natural guidance in a highway maneuver that contains lane guidance. The client always gives priority, to natural guidance if available.

EXAMPLES

On a surface road, the application prompts the user device to "Turn left at the traffic light onto Aliso Viejo Parkway" instead of "Use the left two lanes and turn at the traffic light onto Aliso Viejo Parkway."

On a freeway, the application prompts the user device to "Use the left two lanes and exit the freeway at El Toro road" instead of "Use the left two lanes and exit the freeway after the blue building on the right at El Toro road".

Voice Lane Guidance

Voice Lane Guidance is provided if available, subject to the following conditions:

Data for the road segment is available in the lane guidance database provided by the map data provider.

Only Prepare and Turn instructions; Continue instructions do not use lane guidance.

Stacked instructions use Lane Guidance as available for the two maneuvers.

If the exit lane(s) are not the right/leftmost lanes, then voice lane guidance is skipped and normal prompts is used instead. The visual lane guidance still shows the correct lanes to take, but the announcement is skipped as it would be too complicated.

To determine if the announcement can be made, the client counts the lanes (by looking at the number of lane-guidance-item elements present in the lane-info element for the maneuver), then evaluates if the position of the selected lanes is on either side or in the middle. If the calculated position cannot be described (using the lane positioning identifiers) then the announcement is not provided and the standard straight/right/left announcement is provided instead.

> Example "Use the second lane from the right . . . " is too complicated, so the system will use the normal "Turn right . . . " instead.

Lane Positioning Identifiers

| Left | Center | Right |
|---|---|---|
| Left Lane (left-lane) (only one lane) | Center lane (center-lane) there are lanes on both sides of the maneuver point and only one lane in the center to complete the maneuver | Right Lane (right-lane) (only one lane) |
| Left 2 Lanes (left-2-lanes) (2 lanes available) | | Right 2 Lanes (right-2-lanes) (2 lanes available) |
| Left 3 Lanes (left-3-lanes) (3 lanes available) | Center lanes (center-lanes) there are lanes on both sides of the maneuver point and multiple lanes in the center to complete the maneuver | Right 3 Lanes (right-3-lanes) (3 lanes available) |
| Left 4 Lanes (left-4-lanes) (4 lanes available) | | Right 4 Lanes (right-4-lanes) (4 lanes available) |

Adjacent Exits

Voice Lane Guidance is not given in situations where exits and off-ramps are in close proximity to each other and share the same line information.

Clipping

Announcements are never clipped. The client calculates the announcement length, and moves the announcement earlier to ensure that it fits the available time.

Visual Lane Guidance

The visual lane guidance feature enhances the maneuver display information by incorporating full display of the available lanes in the freeway, when available in the map data. An otherwise regular turn icon display is replaced with a variable width image that grows to show all available lanes, highlighting the ones the user device needs to use to complete the maneuver.

Divider Types

The protocol provides the following divider types to the client. Only a small subset is usually used.

> long-dash-divider
> double-solid-divider
> single-solid-divider
> solid-dash-divider
> dash-solid-divider
> short-dash-divider
> shaded-area-divider
> block-dash-divider
> physical-divider
> double-dash-divider
> no-divider
> crossing-alert-divider
> center-turn-line-divider Direction Categories The protocol provides the following direction types to the client, which can be combined as needed. A set is provided for selected directions (those that are part of the maneuver) and another one for unselected. Directions can be combined, but not all combinations are valid.

> straight-arrow
> slight-right-arrow
> right-arrow
> hard-right-arrow
> u-turn-left-arrow
> hard-left-arrow
> left-arrow
> slight-left-arrow
> merge-right-arrow
> merge-left-arrow
> merge-lanes-arrow
> u-turn-right-arrow
> second-right-arrow
> second-left-arrow Display To enable this display, the protocol is enhanced to provide the additional lane information, and the client is enhanced to dynamically build the lane display using a custom TrueType font that can be scaled to suit any display.

Lane Font

A new lane TrueType font was created to enable the display of the lane guidance image. TrueType is an outline font standard. The font provides individual characters that represent each possible line situation, and which can be "printed" together to form the current lane configuration for the maneuver. Since TrueType fonts are vector-based, they can be used to generate the lane images at any size, in a platform-independent fashion.

The lane font has direction arrows, which can be combined to form composite arrows; and additional direction arrows as needed to allow replacement of the routing icons currently in use. Lane dividers may also be implemented if desired.

Font Mapping

To map the maneuver commands to the corresponding font code, the following exemplary table is used.

| Command | Code | Image | Command | Code | Image | Command | Code | Image |
|---|---|---|---|---|---|---|---|---|
| EC. | | | EN. | | | EX. | | |
| EC.L | | | EN.L | | | EX.L | | |
| EC.R | | | EN.R | | | EX.R | | |
| FE. | | | KP. | | | RE. | | |
| FX. | | | KP.L | | | RX.1-10 | | |
| PE | | | KP.R | | | RT. | | |
| TR.L | | | MR.L | | | DT. | | |
| TR.R | | | MR.R | | | DT.L | | |
| UT. | | | NC. | | | DT.R | | |
| NR. | | | BE. | | | DT.U | | |
| NR.L | | | BE.L | | | TE. | | |
| NR.R | | | BE.R | | | TE.L | | |
| ES. | | | EE. | | | TE.R | | |
| ES.L | | | EE.L | | | TI. | | |
| ES.R | | | EE.R | | | TI.S | | |

-continued

| Command Code | Image | Command Code | Image | Command Code | Image |
|---|---|---|---|---|---|
| ER. | | TC. | | SC. | |
| ER.L | | TC.S | | SC.S | |
| ER.R | | OR. | | | |

Building the Image

The client builds the image by printing characters next to each other using the new TrueType font and a few rules. Each character can be regular or highlighted. Highlighting is used to convey where the driver should be. Elements such as lane dividers and direction arrows can be drawn in a different color.

Figure 8A:
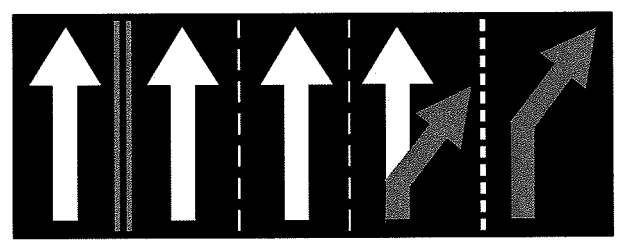
FIGS. 8A and 8B show exemplary lane guidance for taking a right turn depicted in a color different from that used to depict the ongoing lanes, in accordance with the principles of the present invention.
Figure 8B:
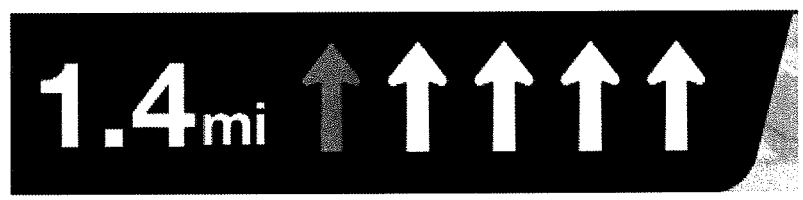

For instance, FIGS. 8A and 8B show exemplary implementation s of lane guidance for taking a right turn depicted in a color different from that used to depict the ongoing lanes. Double yellow lines may be shown as depicted in FIG. 8A or 8B, as can be highlighted lines. Arrows can be combined to form new composite arrows, e.g., the straight arrow plus a slight right arrow in the example of FIG. 8A.

Timing

The timing for visual lane guidance is configurable. The configuration is dynamically accomplished through the server.

Visual Lane Guidance is displayed at the same time that voice Lane Guidance is announced.

View Support

Visual Lane Guidance is displayed in the following navigation views: 3D perspective, 2D perspective, and Dashboard. Preferably Visual Lane Guidance is not integrated with the List view.

Figure 9:
FIG. 9 shows guidance for taking a left turn, in accordance with the principles of the present invention.

FIG. 9 shows guidance for taking a left turn, in accordance with the principles of the present invention.

In particular, as shown in FIG. 9, a new visual lane guidance widget is dynamically generated using a TrueType font instead of the conventional routing icon images. It also uses (when available) lane guidance information to show additional information for the upcoming maneuver.

Data used by the visual lane guidance widget comes from the following sources:

NextTurnDistance is calculated by the navigation engine.

The NextTurnImage depends on whether or not lane guidance is available, which can be queried via a new isLaneInformationAvailable method in the NavigationState class. If Lane guidance is available then the information comes from the lane-info element in the maneuver, which is provided via the new LaneInformation class obtained from the NavManeuver class via the new getLaneInformation method. If Lane guidance is not available then the information comes from the command attribute in the nay-maneuver element (no changes). The client then maps the command to the appropriate character code used to represent the icon.

The StackedTurnInfo is displayed when the stack-advise element is present in the nay-maneuver and the client decides to show the stacked maneuver.

The StackedTurnImage is obtained based on the command attribute of the following nay-maneuver when StackedTurnInfo is displayed and is drawn in a similar way to the NextTurnImage. Lane guidance information is not used in this case.

View Integration

Figure 10:
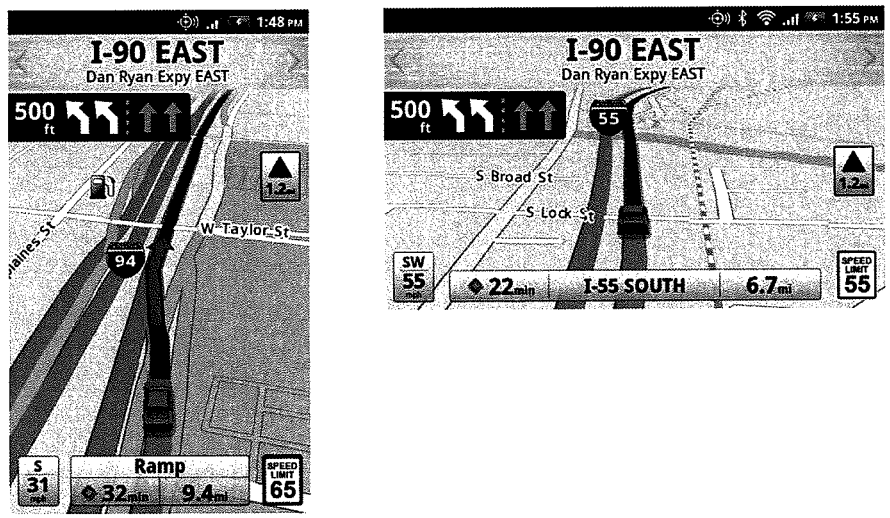
FIG. 10 shows the display of the prominent Visual Lane Guidance in a 3D vector view, in accordance with the principles of the present invention.
Figure 11:
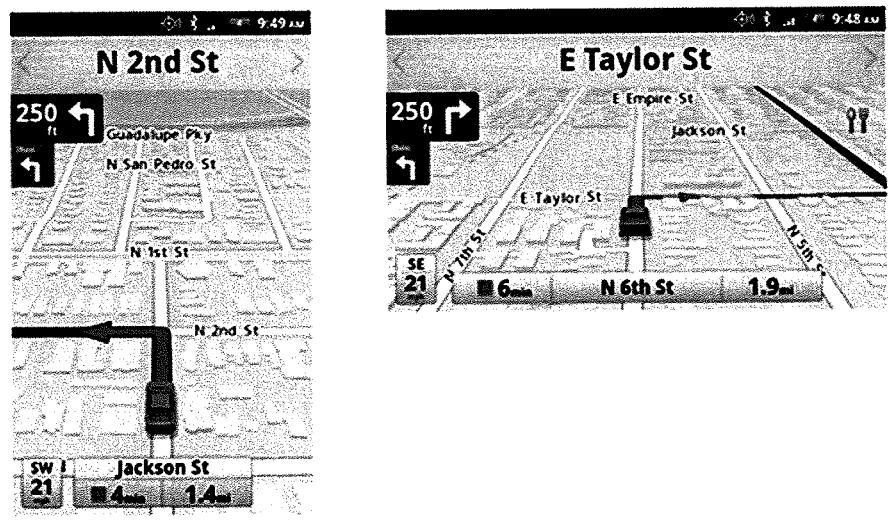
FIG. 11 shows an exemplary regular maneuver (no lane guidance) using the inventive lane guidance widget which displays maneuvers using the inventive TrueType lane guidance font, in accordance with the principles of the present invention.
Figure 12:
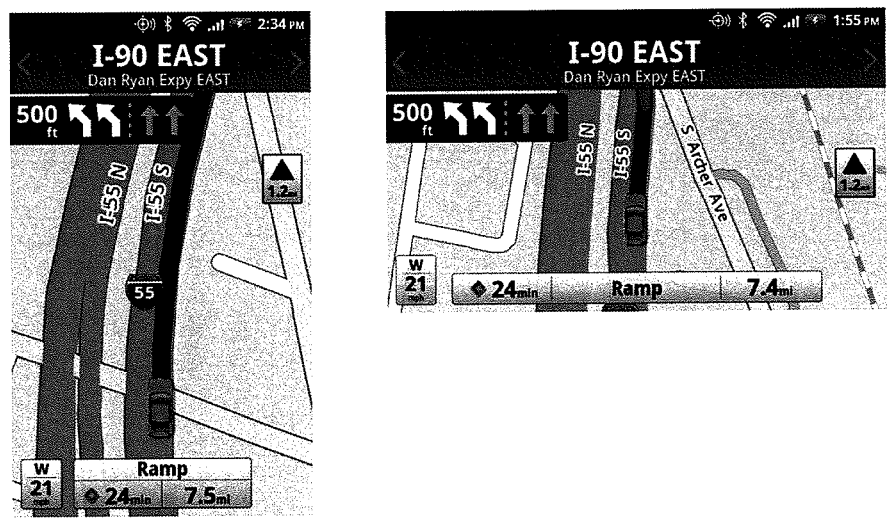
FIG. 12 shows the display of the prominent Visual Lane Guidance in a 2D vector view, in accordance with the principles of the present invention.
Figure 13:
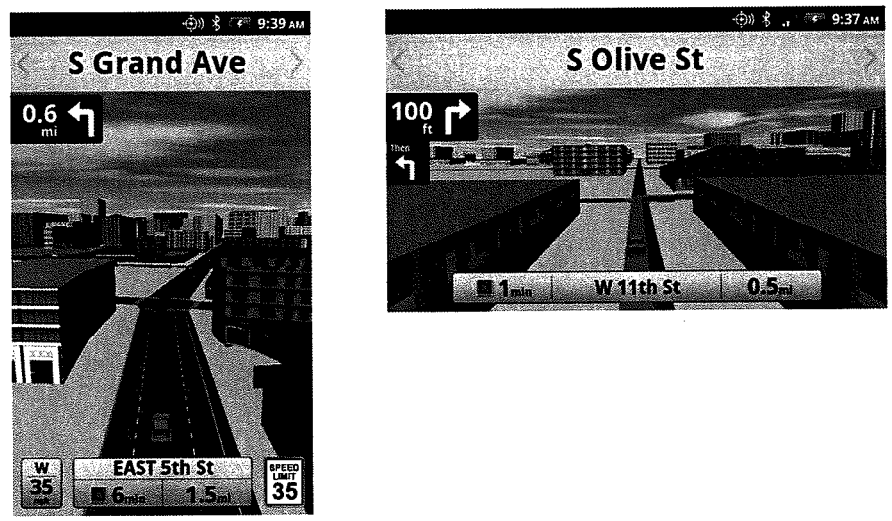
FIG. 13 shows the display of the prominent Visual Lane Guidance in an ECM view, in accordance with the principles of the present invention.
Figure 14:
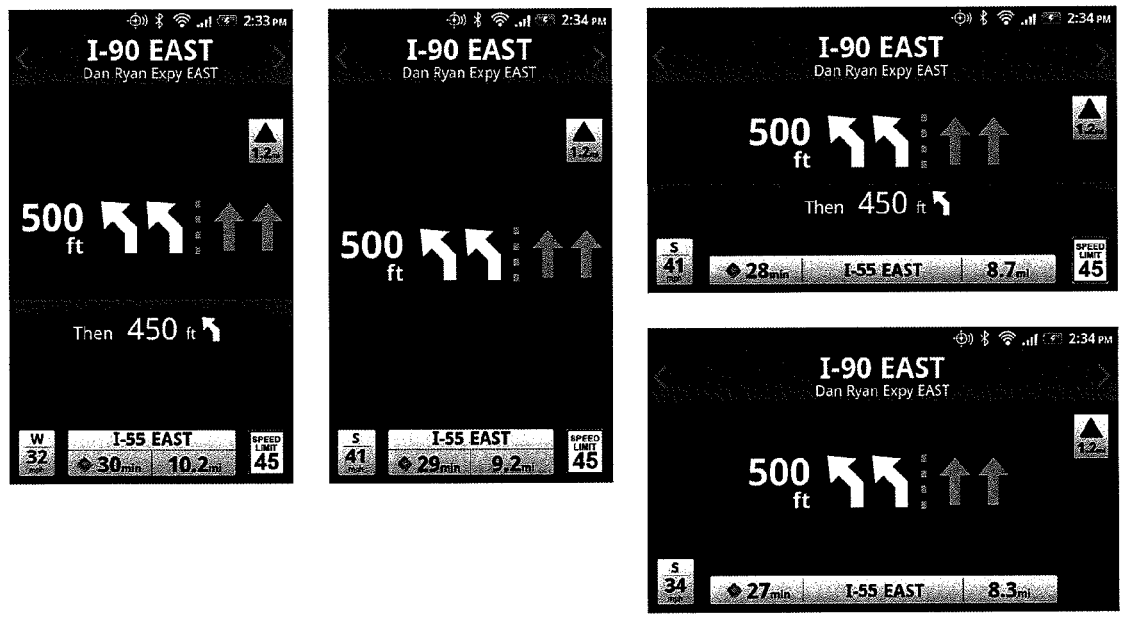
FIG. 14 shows the display of the prominent Visual Lane Guidance in a dashboard view, in accordance with the principles of the present invention.

The display of the Visual Lane Guidance is preferably prominent and integrated well with the following views and elements on the screen: 3D vector view (FIGS. 10A and 10B); 3D vector view with stacked maneuver (FIG. 11); 2D vector view (FIG. 12); SAR; ECM view (FIG. 13); MJO view; and dashboard view (FIG. 14).

The present invention provides navigation guidance that makes instructions as succinct as possible; deliver the information in a more human-like manner; eliminate unnecessary announcements; and keep announcements that help maintain the user device on the right path, especially in situations where there could be confusion.

Announcements

The following terminology is used to describe navigation announcements: Continue announcement; Prepare announcement; and Turn announcement.

The Continue announcement is the first instruction in the series leading to a maneuver, usually following the turn instruction from the previous maneuver, and is only given when there is enough distance in the segment to allow for three instructions. The purpose is to provide to the user device how long of a drive remains until the next maneuver point is hit. The Continue announcement is used to inform the user of the distance to the next turn or their destination.

The Prepare announcement is a second instruction in the series, usually following the continue instruction. Its purpose is to help the drivers position themselves in the correct lane and prepare for the actual maneuver.

The Turn announcement is a final instruction in the series, in most cases following the Prepare instruction. Its purpose is to instruct the user to perform the maneuver.

The Continue announcement is formatted in the exemplary embodiments as: "Your next turn is in <x> miles" when there is an upcoming maneuver, or "Your destination is in <x> miles" when the destination is approaching. To make the announcement sound more natural, the distance is rounded up to the nearest ½ mile increment when the distance is above two miles and to the nearest ¼ mile increment when the distance is less than 2 miles. If the application is set to use the metric system, then the rounding is to the nearest ½ kilometer.

The Prepare announcement is used to inform the user that the maneuver turn is approaching and to provide additional guidance information if available. The Prepare announcement does not contain distance to the turn.

The Turn announcement informs the user to make the maneuver. The Turn announcement does not contain distance to the turn.

Timing and Positioning of Announcements

The timing of navigation announcements depends on the type of road being traveled, the current speed of the vehicle and the length of the announcement itself. As part of the Natural and Lane Guidance effort, some key changes are made in how the timing is calculated.

Figure 15:
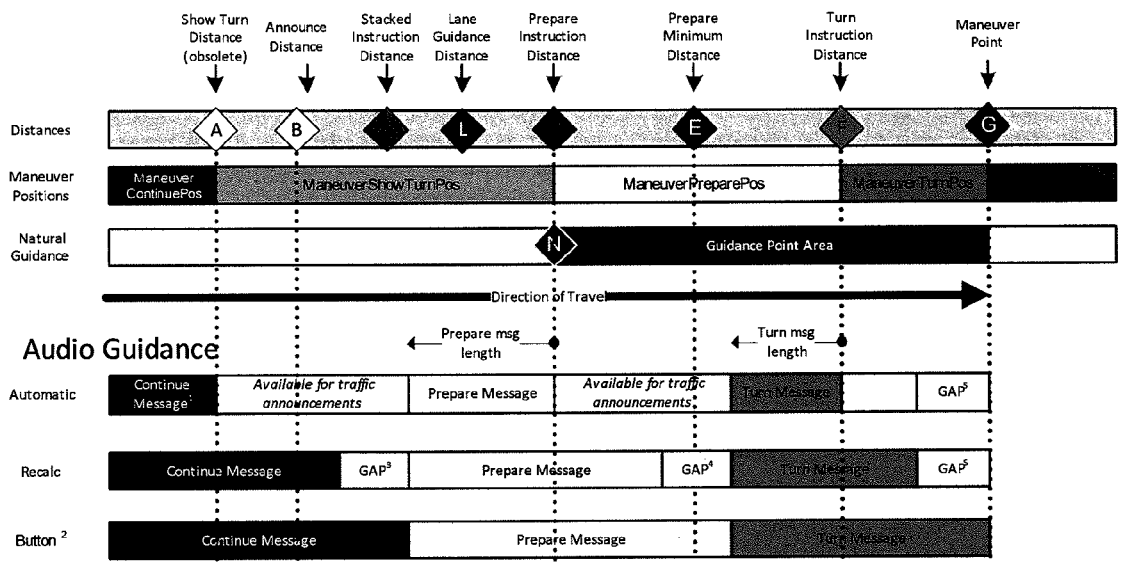
FIG. 15 shows the various points at which announcements are made, and what other things depend on those points, in accordance with the principles of the present invention.
Figure 15:
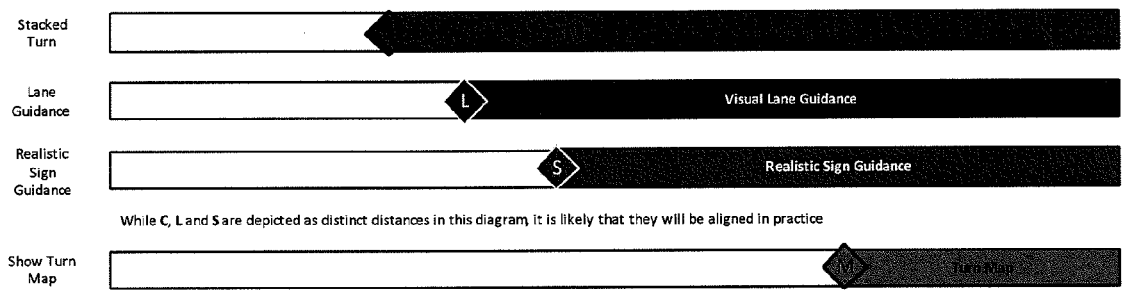

FIG. 15 shows the various points at which announcements are made, and what other things depend on those points. In the disclosed embodiments, the routing engine defines the maneuvers, but the client uses the information provided to calculate when and where to provide announcements. For Natural Guidance, the routing engine calculates the Guidance Point Area for each maneuver, which depends on the speed of the segment.

The following are key changes from the otherwise conventional implementation:

The playback time for all messages is now calculated ahead of time by the client and used in the timing calculations.

Clipped messages are avoided in most situations.

The Prepare instruction distance now marks the end of the prepare message in the automatic mode.

The Turn instruction distance now marks the end of the turn message in the automatic mode.

Traffic announcements are only allowed (if they fit completely with an additional buffer as shown and described with respect to FIG. 15) in the time between the continue message and the prepare message, or in the time between the prepare message and the turn message.

Recalc announcements no longer result in the prepare message and the turn message possibly played ahead of time. If the recalc happens such that a message cannot be immediately played (because it doesn't fit), then the application will wait until the correct message can be played. Repeated messages are removed.

Since the prepare instruction distance and turn instruction distance now specify the end of the prepare and turn message announcements, their positions may be moved later as no longer need to account for long messages.

Distance Calculations

The client currently uses the following formula to calculate the distance for the announcements:

Announcements Distances

| | Name | Description |
|---|---|---|
| A | Show Turn Distance | The distance at which the specific turn information is displayed. |
| B | Announce Distance | The distance at which the prepare message is allowed to be repeated when the user device reaches the Prepare Instruction Distance. Note: this is no longer needed with the timing changes. |
| C | Stacked Instruction Distance | The distance at which a stacked instruction is displayed. |
| L | Lane Guidance Distance | The distance at which Lane Guidance is displayed if available. |
| D | Prepare Instruction Distance | The distance at which the prepare message for the upcoming maneuver completes playing. |
| E | Prepare Minimum Distance | The minimum distance at which the user device is instructed to prepare for the next maneuver. This is meant to keep the prepare and the turn messages from occurring back to back. Note: this is no longer needed with the timing changes. |
| F | Turn Instruction Distance | The distance at which the turn message for the upcoming maneuver completes playing. |
| G | Maneuver Point | The point at which the turn occurs. |

Announcement Distance Calculation

The values for each of these distances are calculated based on the current speed of the user according to the following formula:

$$D = (S \times A + B) \times M$$

| Variable | Name | Description |
|---|---|---|
| D | Distance | The desired distance. |
| S | Speed | The current speed (if known), otherwise the default speed for the current maneuver.. |

-continued

| Variable | Name | Description |
|---|---|---|
| A | Base Multiplier | The basic multiplier factor derived from the DOT study. See the following tables for specific values. |
| B | Base Addition | The basic additive factor derived from the DOT study. See the following tables for specific values. |
| M | Multiplier | The final multiplier factor. The specific multiplier for distance to be calculated. See the following tables for specific values. |

Announcement Distance Values

The following table lists the specific values for the Base Multiplier (A) and Base addition (B) for the various types of maneuvers:

| Type | Base Multiplier | Base Addition |
|---|---|---|
| Normal | 8.0 | 37.144 |
| Highway | 8.0 | 40.0 |
| Destination | 3.0 | 50.0 |

The following table lists the specific values for the final multiplier (M) for the various types of maneuvers:

| Type | Announce | Stacked Turn | Lane guidance | Prepare | Prepare Minimum | Turn |
|---|---|---|---|---|---|---|
| Normal | 6.9 | 3.25 | 0 | 3.25 | 3 | 0.7 |
| Highway | 8.05 | 8 | 0 | 8 | 4 | 1.5 |
| Destination | 86.25 | 0 | 0 | 8 | 5 | 0.5 |

Guidance Point Area Calculation

To calculate the extent of the Guidance Point Area, the routing engine obtains the position for $N_B$, the start of the Guidance Point Area. The other end of the Guidance Point Area ($N_E$) is defined by the geography around the maneuver point, as it includes potential guidance points that are adjacent to the maneuver point but immediately after it.

Changes in Timing

The inventors hereof recognized that the conventional announcement method has some issues which are fixed and/or improved upon with the present invention. The client does not calculate how long an announcement prompt is before playing it. Also, announcements start at well-defined points but have variable length, so the end point is unpredictable, forcing longer-than-needed times before the turn to accommodate for the longest messages. Moreover, the time between the prepare prompt and the turn prompt can be small, and it often collides with traffic messages, which are then clipped (and later replayed) to allow for timely playback of the turn message.

Figure 16:
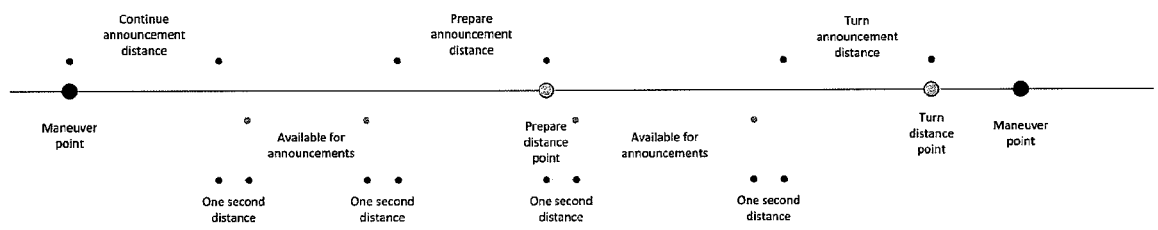
FIG. 16 depicts an exemplary 'slot' definition to determine whether there is sufficient time of travel to play a traffic announcement in between navigation announcements, in accordance with the principles of the present invention.

FIG. 16 depicts an exemplary 'slot' definition to determine whether there is sufficient time of travel to play a traffic announcement in between navigation announcements, in accordance with the principles of the present invention. In particular, as shown in FIG. 16, the present invention modifies its timing of announcements as follows:

All messages including traffic are pre-processed at the start of the maneuver (ahead of the time of play) and their playback time is calculated.

The start of playback for automatic prepare and turn messages is moved such that the end of the message (as opposed to the start) coincides with the prepare/turn distance. The playback distance is calculated using the message play time and the vehicle's current speed. The calculated distance is added to the announcement distance to calculate the adjusted announcement distance. In the event that GPS fixes cease to be received temporarily (for example inside a tunnel) and the next received fix is past the desired start of playback, the prepare message is played only if the current position plus the calculated distance used to play the message at the current speed allows for at least a 2-second gap before the maneuver point. Also only if the message references a guidance point, the point must be positioned after the expected end of playback. If this is not the case, but there is still time to play the message, the client reprocesses the message without using the guidance point.

The turn message is always played as long as the user is before the maneuver point. The content of the announcement is reduced as much as needed to make it fit the available time, but the message is played regardless of whether it fits the slot.

Any real-time audio snippets (such as time or distance) are re-processed just before playback for accuracy. Since distances are removed from Prepare and turn messages, this is not likely to be a common occurrence.

The announcement distance parameter is reworked to account for the difference and move the announcement end points closer to the maneuver point.

The (expected) time between the end of the continue announcement and the start of the prepare announcement is calculated. If the Continue announcement is skipped, then the Prepare announcement is moved up to the start of the maneuver, effectively removing the first traffic announcement slot.

The (expected) time between the end of the prepare announcement and the start of the turn announcement is calculated.

If there are pending traffic announcements, the client checks to see if the announcements fit with more than 2 seconds buffer in the available time between announcements. If an announcement fits between the continue and prepare announcements, it is played one second after the continue announcement completes. If an announcement fits between the prepare and turn announcements, it is played one second after the prepare announcement completes. If the announcements don't fit, they are queued, and attempted to fit in again for play during the next maneuver.

Prepositions

Prepositions are used to give the position of the maneuver relative to the Guidance point. The current list of prepositions is extended as needed to cover the updated instructions.

Maneuver Direction

The following maneuver directions are available for guidance:
  Left
  Slight Left
  Hard Left
  Right
  Slight Right
  Hard Right
  U-Turn
  Continue On
  Stay Direction information is carefully considered, and modifiers such as slight or hard are used only as needed to aid in the user's understanding of the maneuver under special conditions.

Concatenation

Guidance prompts are usually generated by concatenating audio snippets that are part of the application's data with street names that are downloaded as part of the nav-reply. For instructions where distances are not referenced, all combinations of instructions prior to the street name are pre-processed. Distances will not usually be required for Prepare To and Turn instructions.

Special Processing of Audio Fragments

To provide better speech quality, some longer than needed audio phrases are generated. For example, the sentence "Get ready to keep left at the fork and take Main street" is usually broken into "Get ready to", "keep left", "at the fork", "and take" and "Main street", with the street name being downloaded from the server. While this saves considerable space, it breaks the context of the sentence for the speech generator and results in less natural pronunciation.

To maintain flexibility while also allowing for improvement in quality, a new method is used to concatenate the audio fragments and allow for easy joining of fragments into longer fragments. Using the example above, each audio fragment has a "sound id" which maps to the filename. For example the mapping may be as shown in the following table:

| Text | sound ID | Filename |
| --- | --- | --- |
| Get ready to | get-ready-to | get-ready-to.aac |
| keep left | keep-left | keep-left.aac |
| at the fork | at-the-fork | at-the-fork. aac |
| and take | and-take | and-take.aac |
| Main street | <dynamic-id> | <dynamic-id>.aac |

If it is desired to join the fragments into a single fragment for better pronunciation quality, the entire fragment "Get ready to keep left at the fork and take" may be generated as a single audio file, but be named such that the sound IDs of the individual fragments are joined using the '+' character. In the example above, the new sound ID representing the larger audio fragment is "get-ready-to+keep-left+at-the-fork+and-take" and the filename is "get-ready-to+keep-left+at-the-fork+and-take.aac".

To automatically discover these improved audio fragments, the client code attempts to concatenate the pieces and verify if a matching filename exists. Since most compound fragments only have a few components, calculating all possible combinations is a simple and quick process, and the longest available fragments are used.

In the example above, the combinations are:
get-ready-to+keep-left+at-the-fork+and-take+<dynamic-id> (all 5)
get-ready-to+keep-left+at-the-fork+and-take (4 at a time)
keep-left+at-the-fork+and-take+<dynamic-id> (4 at a time)
get-ready-to+keep-left+at-the-fork (3 at a time)
keep-left+at-the-fork+and-take (3 at a time)
at-the-fork+and-take+<dynamic-id> (3 at a time)
get-ready-to+keep-left (2 at a time)
keep-left+at-the-fork (2 at a time)
at-the-fork+and-take (2 at a time)
and-take+<dynamic-id> (2 at a time)

So the method is as follows:
Step 1: Take a compound fragment consisting of n pieces.
Step 2: Concatenate the n sound IDs using '+' and see if a filename exists.
Step 3: If found, use that file instead of the individual fragments.
Step 4: If not, repeat the process for each possible subset of n-1, n-2, . . . , 2 consecutive pieces.
Step 5: If a match is found, replace the matched pieces with the new compound piece, and repeat the algorithm with any pieces before and after the replaced piece containing two or more pieces.

Step 6: If no matches are found, concatenate the individual pieces.

This method is run for any subset of the sentence containing 2 or more sub-elements, so for the example above, it should be possible to end with "get-ready-to+keep-left", "at-the-fork+and-take" and "<dynamic-id>" being used instead of the original individual pieces. Also, since the method starts with longest combinations first, priority is given to those over smaller ones, which is the desired effect. Lastly, the method does not differentiate between base voices and voices downloaded from the server. Though in the disclosed embodiments downloaded voices may never match, a feature may be added to allow requesting compound voices dynamically, or to generate the voices using text to speech.

Freeway Exit Numbers

When travelling on a freeway, exit numbers are added to the maneuver used to exit the freeway. For example: "Prepare to stay in the left to lanes and take Exit 8, MacArthur Blvd".

Figure 17:
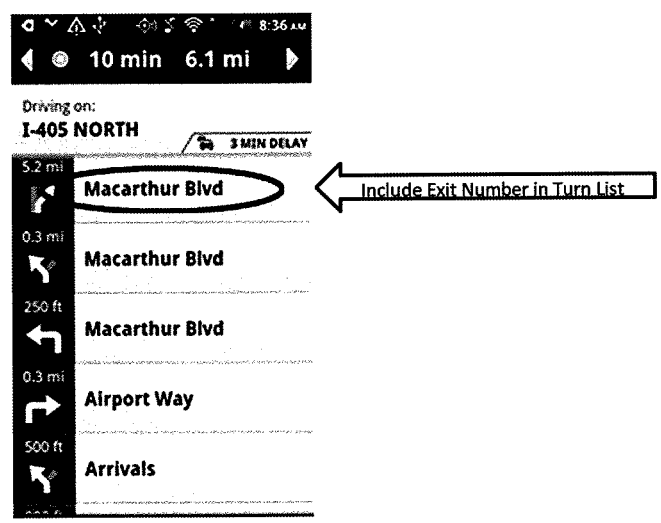
FIG. 17 shows the appearance of a freeway exit, and a suggested place for the exit number in the turn list, in accordance with the principles of the present invention.

FIG. 17 shows the appearance of a freeway exit, and an exemplary location for an associated exit number, in the turn list, in accordance with the principles of the present invention. The font size of the exit number in the turn bar at the top may be increased to make it more visible. FIG. 17 indicates an exemplary location for an appropriate exit number.

Protocol Changes
Announcement-Distance-Parameters
Elements

| Type | Number | Description |
|---|---|---|
| ann-base-multiplier | 1 | Base multiplier for the announcement distance calculation. |
| ann-base-addition | 1 | Base addition for the announcement distance calculation. |
| ann-multiplier | 1 | Multiplier for the announcement distance calculation. |

Attributes

| Name | Type | Description |
|---|---|---|
| none | | |

Ann-Base-Multiplier
Elements

| Type | Number | Description |
|---|---|---|
| none | | |

Attributes

| Name | Type | Description |
|---|---|---|
| normal | float | Base multiplier for normal roads. |
| highway | float | Base multiplier for highway. |
| destination | float | Base multiplier for destination. |

Ann-Base-Addition
Elements

| Type | Number | Description |
|---|---|---|
| none | | |

Attributes

| Name | Type | Description |
|---|---|---|
| normal | float | Base addition for normal roads. |
| highway | float | Base addition for highway. |
| destination | float | Base addition for destination. |

Ann-Multiplier
Elements

| Type | Number | Description |
|---|---|---|
| ann-multiplier-values | 3 | Values for the announcement distance multiplier. The first element is for normal street, second for highway and third for destination. |

Attributes

| Name | Type | Description |
|---|---|---|
| none | | |

Ann-Multiplier-Values
Elements

| Type | Number | Description |
|---|---|---|
| none | | |

Attributes

| Name | Type | Description |
|---|---|---|
| announce | float | Announce multiplier value. |
| stacked-turn | float | Stacked turn multiplier value. |
| lane-guidance | float | Lane guidance multiplier value. |
| prepare | float | Prepare multiplier value. |
| prepare-minimum | float | Prepare minimum multiplier value. |
| turn | float | Turn multiplier value. |

Nav-Query
Elements
The following optional elements are added to the query:

| Type | Number | Description |
|---|---|---|
| want-guidance-config | 0...1 | If present, indicates that the client wants to specify natural and lane guidance features. |
| want-exit-numbers | 0...1 | If present, road exit names or numbers is added to the roadinfo element in the appropriate maneuvers. |

Want-Guidance-Config
Elements

| Type | Number | Description |
|---|---|---|
| want-enhanced-natural-guidance | 0...1 | If present, indicates that the client wants additional guidance points using NAVTEQ's Natural Guidance product. Note: The present invention is designed to work together with NAVTEQ's Natural Guidance, or independently therefrom. |

-continued

| Type | Number | Description |
|---|---|---|
| want-natural-guidance | 0 . . . 1 | If present, indicates that the client wants natural guidance using the present invention's guidance points.<br>Note: The present invention is designed to work together with NAVTEQ's Natural Guidance, or independently therefrom. |
| want-lane-guidance | 0 . . . 1 | If present, indicates that the client wants lane guidance information added to the appropriate maneuvers. |

Attributes

| Name | Type | Description |
|---|---|---|

Nav-Maneuver
Elements

The following elements are added to provide guidance point and lane guidance information.

| Type | Number | Description |
|---|---|---|
| guidance-point | 0 . . . 2 | These optional elements contain the information for guidance points (if available) associated with the maneuver. Note: these elements will only be present if want-NAVTEQ-natural-guidance or want-tcs-natural-guidance are specified in the nav-query. |
| lane-info | 0 . . . 1 | This optional element contains the lane guidance information (if available) for this maneuver. Note: this element will only be present if want-lane-guidance is specified in the nav-query. |

Attributes

| Name | Type | Description |
|---|---|---|

Guidance-point
Elements

| Type | Number | Description |
|---|---|---|
| point | 1 | Position of the guidance point in coordinates, so it can be displayed on the map. |
| use-for-prepare | 0 . . . 1 | If this element is present, this guidance point can be referenced in the Prepare to instruction. |
| use-for-turn | 0 . . . 1 | If this element is present, this guidance point can be referenced in the Turn instruction. |

Attributes

| Name | Type | Description |
|---|---|---|
| description | string | String containing the description of the guidance point. Examples: "red building", "Mobil gas station", "train tracks" |
| gp-pronun | string | The pronunciation key for the guidance point description. |
| gpprep-pronun | string | The pronunciation key for the preposition to use when referring to the guidance point. |

-continued

| Name | Type | Description |
|---|---|---|
| maneuver-point-offset | float | Distance to the maneuver point. If the guidance point is past the maneuver point, this should be zero. |

Lane-Info
Elements

The lane-info element provides a set of lane-guidance-item elements which are used to build the lane guidance display on the client.

| Type | Number | Description |
|---|---|---|
| lane-guidance-item | 0 . . . n | Lane guidance information is provided as a list of these items, each representing a line element at the maneuver point. |

Attributes

| Name | Type | Description |
|---|---|---|
| number-of-lanes | uint | The number of lanes that are used in the maneuver. |
| lane-position | uint | The position of the lanes starting from the leftmost lanes, 1-based. Example, if the road has 7 lanes and two lanes on the right (leaving the rightmost lane out) are used, then this will contain '5' and number-of-lanes is 2 meaning lanes 5 and 6 are used for the maneuver. |
| lgprep-pronun | string | Pronun key for the lane guidance preposition. Example: the. |
| lg-pronun | string | Pronun key for the lane guidance instruction. Example: right-2-lane. |

Lane-Guidance-Item
Elements

Each guidance item comprises a lane type, an arrow type (which can be optionally highlighted), and a right divider item. Guidance items are specified from left to right.

| Type | Number | Description |
|---|---|---|
| lane-item | 1 | Provides the lane type. |
| divider-item | 1 | Provides the divider type. |
| arrow-item | 1 . . . 2 | The first element contains the non-highlighted arrow elements for this lane and the second one (if present) the highlighted arrow elements.<br>Example: A lane may contain a straight-arrow and a slight-right-arrow and we want to indicate to the user device that it should take the slight right. So the first element will contain the non-highlighted straight-arrow and the second element will contain the highlighted slight-right-arrow. |

Attributes

| Name | Type | Description |
|---|---|---|
| none | | |

Lane-Item
Elements

This element describes the type of lane to be used for this item. While NAVTEQ provides many different types of lanes in their database, Lane Guidance only uses a small subset thereof.

| Type | Number | Description |
|---|---|---|
| regular-lane | 0 ... 1 | If present, this is a regular lane. |
| hov-lane | 0 ... 1 | If present, this is an HOV lane. |
| reversible-lane | 0 ,,, 1 | If present, this is a reversible lane. |
| express-lane | 0 ... 1 | If present, this is an express lane. |
| acceleration-lane | 0 ... 1 | If present, this is an acceleration lane. |
| deceleration-lane | 0 ... 1 | If present, this is a deceleration lane. |
| auxiliary-lane | 0 ... 1 | If present, this is an auxiliary lane. |
| slow-lane | 0 ... 1 | If present, this is a slow lane. |
| passing-lane | 0 ... 1 | If present, this is a passing lane. |
| drivable-shoulder-lane | 0 ... 1 | If present, this is a drivable shoulder lane. |
| regulated-access-lane | 0 ... 1 | If present, this is a lane with regulated access. |
| turn-lane | 0 ... 1 | If present, this is a turn lane. |
| center-turn-lane | 0 ... 1 | If present, this is a center turn lane. |
| truck-parking-lane | 0 ... 1 | If present, this is a truck parking lane. |

Note:
the above elements can be combined, but not all combinations are allowed. See the lane types table for valid combinations.

Attributes

| Name | Type | Description |
|---|---|---|
| None | | |

Divider-Item
Elements

This element describes the type of divider to be used for this item. While NAVTEQ provides many different types of dividers in their database, Lane Guidance only uses a small subset thereof.

| Type | Number | Description |
|---|---|---|
| long-dash-divider | 0 ... 1 | If present, this is a long dash divider. |
| double-solid-divider | 0 ... 1 | If present, this is a double solid divider. |
| single-solid-divider | 0 ... 1 | If present, this is a single solid divider. |
| solid-dash-divider | 0 ... 1 | If present, this is an inner solid outer dash divider. |
| dash-solid-divider | 0 ... 1 | If present, this is an inner dash outer solid divider. |
| short-dash-divider | 0 ... 1 | If present, this is a short dash divider. |
| shaded-area-divider | 0 ... 1 | If present, this is a shaded area divider. |
| block-dash-divider | 0 ... 1 | If present, this is a dashed block divider. |
| physical-divider | 0 ... 1 | If present, this is a physical divider. |
| double-dash-divider | 0 ... 1 | If present, this is a double dash divider. |
| no-divider | 0 ... 1 | If present, there is no divider. |
| crossing-alert-divider | 0 ... 1 | If present, this is a crossing alert divider. |
| center-turn-line-divider | 0 ... 1 | If present, this is a center turn line divider. |

Attributes

| Name | Type | Description |
|---|---|---|
| None | | |

Arrow-Item
Elements

This element describes the type of lane to be used for this item. While NAVTEQ provides many different types of arrows in their database, Lane Guidance only uses a small subset thereof.

| Type | Number | Description |
|---|---|---|
| straight-arrow | 0 ... 1 | If present, this is a straight arrow. |
| slight-right-arrow | 0 ... 1 | If present, this is a slight right arrow. |
| right-arrow | 0 ... 1 | If present, this is a right arrow. |
| hard-right-arrow | 0 ... 1 | If present, this is a hard right arrow. |
| u-turn-left-arrow | 0 ... 1 | If present, this is a u-turn left arrow. |
| hard-left-arrow | 0 ... 1 | If present, this is a hard left arrow. |
| left-arrow | 0 ... 1 | If present, this is a left arrow. |
| slight-left-arrow | 0 ... 1 | If present, this is a slight left arrow. |
| merge-right-arrow | 0 ... 1 | If present, this is a merge right arrow. |
| merge-left-arrow | 0 ... 1 | If present, this is a merge left arrow. |
| merge-lanes-arrow | 0 ... 1 | If present, this is a merge lanes arrow. |
| u-turn-right-arrow | 0 ... 1 | If present, this is a u-turn right arrow. |
| second-right-arrow | 0 ... 1 | If present, this is a second right arrow. |
| second-left-arrow | 0 ... 1 | If present, this is a second left arrow. |

Notes:
arrow types can be combined, but not all combinations are valid.

Attributes

| Name | Type | Description |
|---|---|---|
| None | | |

Roadinfo
Elements

If want-exit-numbers element is present in the nav-query, then the roadinfo element may contain the following new element:

| Type | Number | Description |
|---|---|---|
| exit-number | 0 ... 1 | This element contains the exit name or number for the maneuver. |

Exit-Number
Elements

| Type | Number | Description |
|---|---|---|
| none | | |

Attributes

| Name | Type | Description |
|---|---|---|
| number | string | The exit name or number for this maneuver. Note: A road exit number can contain non-numeric values such as "13A". |
| pronun | string | The pronunciation key for the exit name or number. |

Server-Based Configuration

All lane and natural guidance configuration is server-based. Some of the configuration values are for the routing engine, some for the server and some for the client. All configuration values are preferentially provided to allow for global updates (cross-platform and cross-version) with the ability of client-specific overrides if needed.

While the invention has been described with reference to the exemplary embodiments thereof, those skilled in the art are able to make various modifications to the described embodiments of the invention without departing from the true spirit and scope of the invention.

What is claimed is:

1. A method of providing audible natural navigational guidance output from a wireless device, comprising:
   receiving, at a wireless device from a network navigation server, an upcoming maneuver point to be navigated from said wireless device;
   measuring a current location and direction of travel of said wireless device with respect to said upcoming maneuver point;
   determining a natural guidance point selection area relating to said upcoming maneuver point;
   varying priorities of a plurality of locally unique geographic features within said determined natural guidance point selection area based on a proximity to said upcoming maneuver point; and
   outputting audio from said wireless device, said audio relating an upcoming maneuver to be navigated at said upcoming maneuver point to one of said plurality of locally unique geographic features having a highest varied priority.

2. The method of providing audible natural navigational guidance output from a wireless device according to claim 1, further comprising:
   outputting audio relating to a prepare to-type guidance outside said natural guidance point selection area.

3. The method of providing audible natural navigational guidance output from a wireless device according to claim 1, wherein types of said plurality of locally unique geographic features comprise:
   a railroad track;
   a traffic light;
   a stop sign;
   an end of road;
   a bridge; and
   a street count.

4. The method of providing audible natural navigational guidance output from a wireless device according to claim 1, wherein a starting priority of said plurality of locally unique geographic features, before being varied, is given in a descending order of priority as follows:
   a traffic light,
   a stop sign,
   an end of road,
   a railroad track,
   a bridge, and
   a street count.

5. The method of providing audible natural navigational guidance output from a wireless device according to claim 1, wherein:
   a starting priority of said plurality of locally unique geographic features, before being varied, is configurable in said network navigation server accessible to said wireless device.

6. The method of providing audible natural navigational guidance output from a wireless device according to claim 1, further comprising:
   determining a location on a navigated route at which to begin outputting said audio from said wireless device based on a type of said one of said plurality of locally unique geographic features having said highest varied priority.

7. The method of providing audible natural navigational guidance output from a wireless device according to claim 1, wherein:
   said wireless device is a smartphone.

8. The method of providing audible natural navigational guidance output from a wireless device according to claim 1, wherein:
   said wireless device is a tablet.

9. The method of providing audible natural navigational guidance output from a wireless device according to claim 1, wherein:
   said natural guidance point selection area does not include area behind said measured current location and direction of travel of said wireless device.

10. The method of providing audible natural navigational guidance output from a wireless device according to claim 1, wherein:
    said audio is output from said wireless device as said wireless device approaches said one of said plurality of locally unique geographic features having said highest varied priority within said natural guidance point selection area.

* * * * *